United States Patent
Regan

(10) Patent No.: US 7,640,341 B2
(45) Date of Patent: Dec. 29, 2009

(54) INSTANT MESSAGING FOR MULTI-USER COMPUTERS

(75) Inventor: Timothy Regan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/600,237

(22) Filed: Jun. 19, 2003

(65) Prior Publication Data

US 2004/0260753 A1 Dec. 23, 2004

(51) Int. Cl.
G06F 15/16 (2006.01)

(52) U.S. Cl. .................. 709/225; 709/204; 709/206

(58) Field of Classification Search .................. 709/204, 709/207, 203, 206, 246, 225; 725/139; 455/517, 455/414
See application file for complete search history.

(56) References Cited

U.S. PATENT DOCUMENTS

| | | | |
|---|---|---|---|
| 6,301,609 B1 * | 10/2001 | Aravamudan et al. ....... | 709/207 |
| 6,668,173 B2 | 12/2003 | Greene | |
| 6,711,608 B1 | 3/2004 | Ogilvie | |
| 6,714,791 B2 | 3/2004 | Friedman | |
| 6,714,793 B1 | 3/2004 | Carey et al. | |
| 2003/0030670 A1 * | 2/2003 | Duarte et al. ................ | 345/758 |
| 2003/0046695 A1 | 3/2003 | Billmaier et al. | |
| 2003/0125062 A1 * | 7/2003 | Bethards et al. .............. | 455/517 |
| 2004/0010808 A1 * | 1/2004 | deCarmo ..................... | 725/139 |
| 2004/0054735 A1 * | 3/2004 | Daniell et al. ............... | 709/206 |
| 2004/0117443 A1 * | 6/2004 | Barsness ..................... | 709/204 |
| 2004/0143633 A1 * | 7/2004 | McCarty ..................... | 709/206 |

FOREIGN PATENT DOCUMENTS

| EP | 1130869 A1 * | 9/2001 |
|---|---|---|
| EP | 1241890 A | 9/2002 |

OTHER PUBLICATIONS

Mobile and Messaging Applications. BroadbandBananas Interactive TV Videos. http://www.broadbandbananas.com/vvmessaging.html, Jun. 20, 2005.
European Search Report, EP31207TE900df, mailed Oct. 5, 2004.
Tim Regan, et al., Media Center Buddies: Instant Messaging Around a Media Center, INET, Online! Jun. 2, 2004, pp. 1-9.
04102539.6 Abstract/Zusammenfassung/Abrege.
Patrice Godefroid, et al., Ensuring Privacy in Presence Awareness Systems: An Automated Verification Approach, Computer Supported Cooperative Work, 2000, 10 pages.

* cited by examiner

*Primary Examiner*—William C Vaughn, Jr.
*Assistant Examiner*—Djenane M Bayard
(74) *Attorney, Agent, or Firm*—Lee & Hayes, PLLC

(57) ABSTRACT

An instant messaging system provides instant message communication between computers, including multi-user computers. The system provides multiple concurrent instant message user logins on a multi-user computer, one of the multiple concurrent instant message user logins being a registered buddy of a user of a second computer. The second computer is provided an indication that the registered buddy is one of multiple concurrent instant message user logins on a multi-user computer. The user of the second computer can send a message appropriate to be viewed on the multi-user computer. A video display may be rendered concurrently with the multiple concurrent instant message user logins. Instant messages are rendered over a portion of the video display. As a result, the instant messaging can operate smoothly with multi-user computers, protecting the privacy of instant messaging while minimizing the disruptiveness of instant messaging to accommodate shared use of a multi-user computer.

20 Claims, 4 Drawing Sheets

Fig. 1 - Prior Art
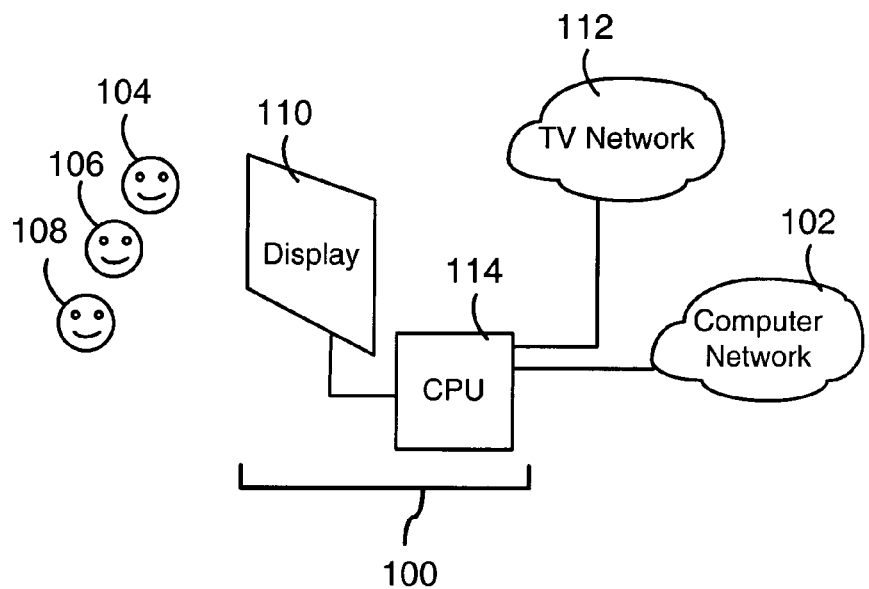
Fig. 3
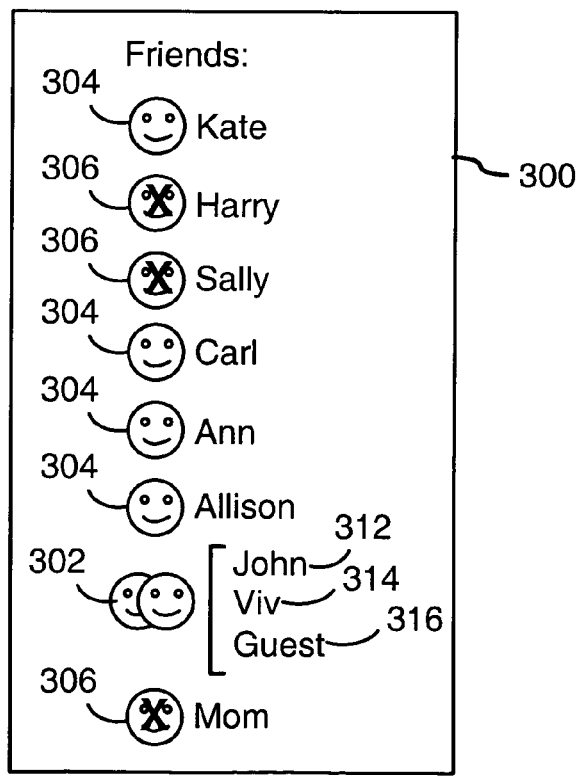

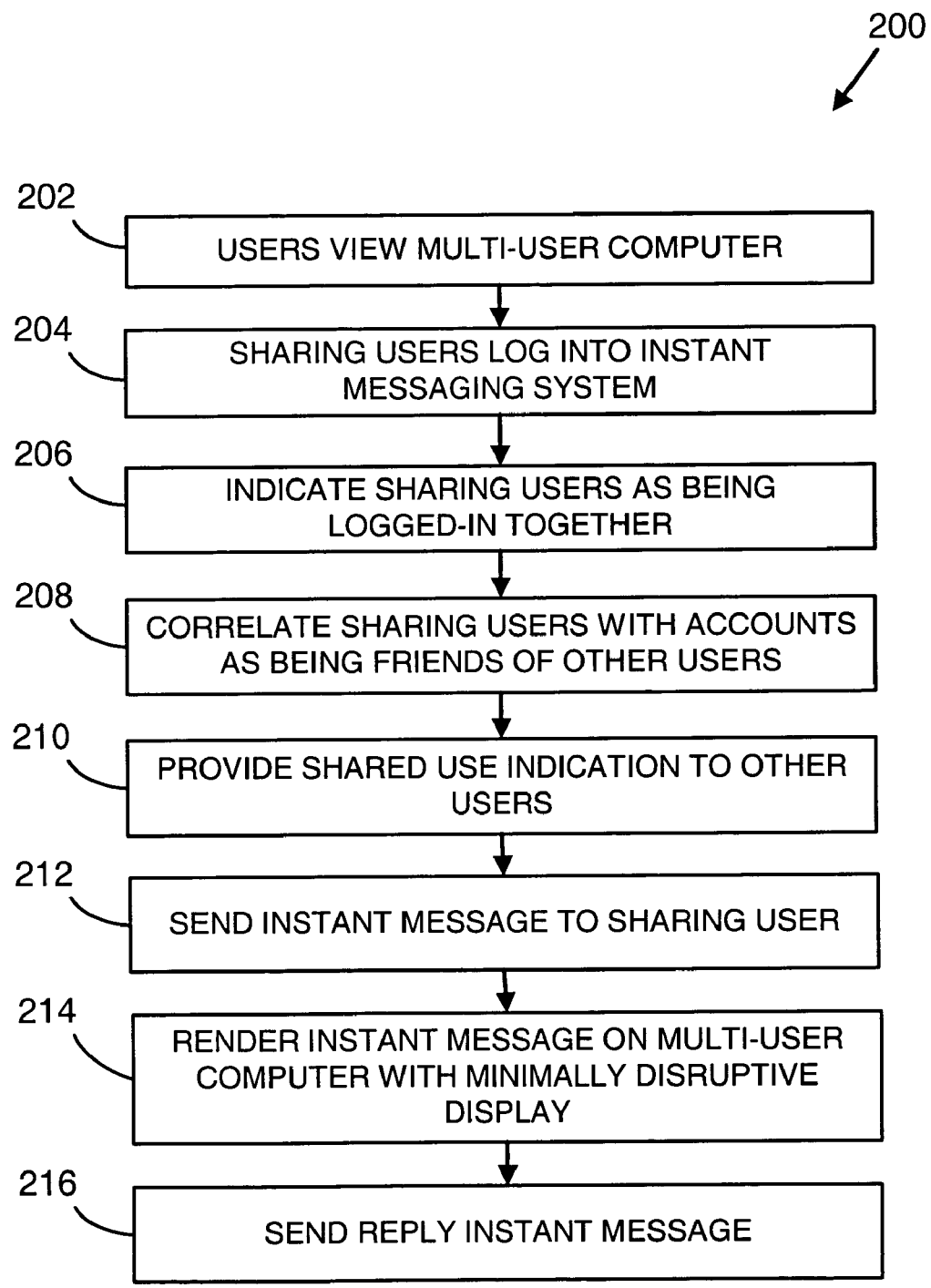

INSTANT MESSAGING FOR MULTI-USER COMPUTERS

FIELD OF THE INVENTION

The present invention relates to computer-based instant messaging communication and, in particular, to instant messaging that is compatible with a multi-user computer being viewed concurrently by multiple users.

BACKGROUND AND SUMMARY OF THE INVENTION

Instant messaging is a computer communication tool in which two users communicate with each other privately in real time over a computer network. Successive messages in the sequence of communications between the users are displayed automatically when received at each user's computer. A user will commonly have a list of "friends" or "buddies" who are other users with whom the user exchanges instant messages. When a user logs in, an instant messaging system will typically notify the user of which "friends" or "buddies" are also logged in and available for instant messaging.

Instant messaging is distinguished from email in that the former is received in a closed state and must be opened to be read by the user, while instant messaging arrives open and immediately readable. Instant messaging is distinguished from computer chat, bulletin boards, and message boards in that instant messaging relates to private communications between just two users rather than the public communication between multiple participants characteristic of online chat and boards.

Instant messaging is typically used in situations in which two users are communicating with each other from two separate computers or instant messaging devices (e.g., handheld computers, cellular telephones, personal digital assistants, etc.). Privacy of the communications is based upon the inherent user-to-user nature of instant messaging communication and the solitary use by each user of his or her computer device.

With convergence of computing and entertainment applications, some personal computers are being adapted to provide multi-user (e.g., home entertainment) functionality as well as conventional personal computer functionality. For example, these computers are adapted to display television programs or play music or videos (e.g., from DVDs) to multiple simultaneous viewers or users, in addition to operating conventional personal computer programs and applications. An example of one such personal computer application or function is instant messaging.

In some instances, combining instant messaging with multi-user computer operation can allow groups of users at different multi-user computer to share a common viewing experience (e.g., watch a movie or sporting event) while simultaneously communicating with each other. A problem can arise, however, because the multiple users viewing a multi-user computer undermine the one-on-one privacy that is usually inherent in instant messaging. As a result, the privacy of messages sent to a multi-user computer for viewing by a particular user can be undermined, and sensitive or private information can be inadvertently displayed to multiple users.

Accordingly, the present invention includes an instant messaging system that provides instant message communication between computers, including multi-user computers. Multi-user computers combine multi-user entertainment functionality with digital or computer functionality and may have any of a variety of implementations, including a personal computer with media capabilities (e.g., video or audio), a video game console, a cable television set-top box, etc.

In one implementation, the system provides multiple concurrent instant message user logins on a multi-user computer. If one of the multiple concurrent instant message user logins is a registered buddy of a user of a second computer then the second computer is provided an indication that the registered buddy is one of multiple concurrent instant message user logins on a multi-user computer. As a result, the user of the second computer is notified of the lack of privacy at the multi-user computer and can send a message with a topic and language that are appropriate to be viewed by multiple users.

In another implementation, a video display, such as a movie or television programming like a sporting even, is rendered on the multi-user computer concurrently with the multiple concurrent instant message user logins on the multi-user computer. Instant messages are rendered over a portion of the video display in a manner that in unobtrusive to the multiple users. As a result, the instant messaging of the present invention can operate smoothly with multi-user computers, protecting the private nature of conventional instant messaging while minimizing the disruptiveness of instant messaging to accommodate shared use of a multi-user computer.

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is a schematic diagram illustration of a multi-user computer with multiple users viewing a shared display as an operating environment of the present invention.

FIG. 2 is a flow chart of a computer-implemented multi-user instant messaging method for providing instant messaging to multiple users a of multi-user computer.

FIG. 3 is an illustration of an instant messaging friends list graphical user interface including a shared use indication that a user friend is logged into a multi-user computer.

DETAILED DESCRIPTION OF PREFERRED EMBODIMENTS

Figure 4A:
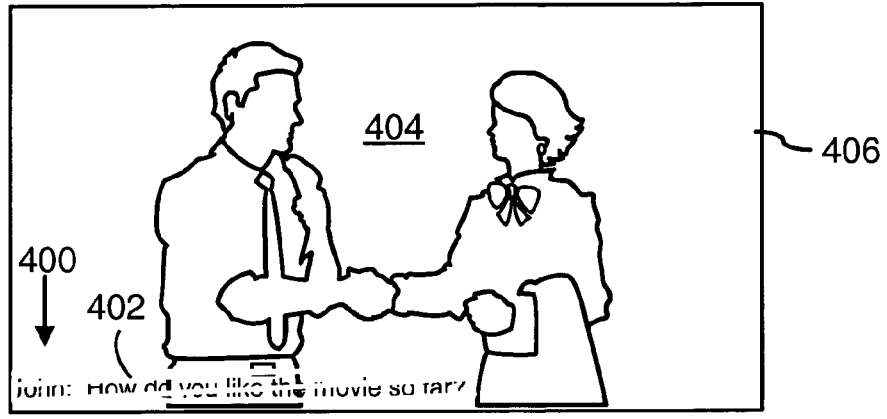
FIGS. 4A-4C are illustrations of a minimally disruptive instant message display for rendering an instant message on media being rendered on a display screen of a multi-user computer.

FIG. 1 is a schematic diagram illustrating a prior art multi-user computer 100 that is connected to a computer network 102 and has two or more users 104, 106, and 108 (three shown) viewing a shared display 110, as an operating environment of the present invention. Multi-user computer 100 combines multi-user entertainment functionality with digital or computer functionality and may have any of a variety of implementations, including a personal computer with media capabilities (e.g., video or audio), a video game console, a cable television set-top box, etc.

The multiple users 104, 106, and 108 could be viewing a video program that is being played locally at computer 100 (e.g., on an included DVD-compatible drive or another connected video replay device, not shown), or is being received over a television-compatible network 112, or users 104, 106, and 108 could be viewing some other shared information such as a video game. Although shown separately, it will be appreciated that computer network 102 and television-compatible network 112 could be one and the same.

In the illustrated implementation, multi-user computer 100 is sometimes referred to as a "home" personal computer and has a central processing unit (CPU) 114 that is connected to display 110 and includes a processor, memory, data storage drives, etc., as is known in the art. A computer-readable medium includes random access memory (RAM), mass storage media, a disk drive and non-volatile memory (e.g. ROM, Flash, EPROM, EEPROM, etc.). Disk drive can include any type of magnetic or optical storage device, such as a hard disk drive, a magnetic tape, a rewriteable compact disc, a DVD and the like. As one example, multi-user computer 100 could operate a media-capable (e.g., audio, video, television, etc.) operating system that accommodates both conventional personal computer functionality and media functionality, such as the Windows® XP Media Center edition operating system, available from Microsoft Corporation. It will be appreciated, however, that other operating systems are also capable of providing personal computer functionality and media functionality and that such systems may be employed by multiple users, whether located in a home or a work location.

One of numerous personal computer type applications or features available on multi-user computer 100 is instant messaging. Instant messaging is a computer communication format in which two users communicate with each other privately in real time over a computer network. Successive messages in the sequence of communications between the users are displayed automatically when received at each user's computer. A user will commonly have a list of "friends" or "buddies" who are other users with whom the user exchanges instant messages. When a user logs in, an instant messaging system will typically notify the user of which "friends" or "buddies" are also logged in and available for instant messaging.

Instant messaging is distinguished from email in that the former is received in a closed state and must be opened by the user to be read. Instant messaging is distinguished from computer chat, bulletin boards, and message broads in that instant messaging relates to private communications between just two users rather than communications between groups of three or more users on three or more computers.

FIG. 2 is a flow chart of a computer-implemented multi-user instant messaging method 200 for providing instant messaging to at least one of multiple users (e.g., users 104, 106, and 108) of multi-user computer 100.

In step 202, multiple users are viewing a common multi-user computer. As an example, users 104, 106, and 108 are viewing a movie or some other media or information on multi-user computer 100. For purposes of description, the multiple users are referred to as "sharing users" as an indication that they are sharing the multi-user computer 100.

In step 204, each of the sharing users logs into an instant messaging system available on the common multi-user computer. The sharing users may log-in under pre-existing personal accounts, or sharing users without personal accounts may log-in under one or more "guest" accounts that are associated with the multi-user computer. The guest accounts do not correspond to a personal account of a specific user. It will be appreciated that a sharing user without a pre-existing personal account could alternatively create a personal account rather than log-in under a "guest" account.

In step 206, the sharing users are indicated as being logged-in together on a shared multi-user computer. For example, the indication is made at an instant messaging server. Sharing users with pre-existing personal accounts are registered as being logged in with at least one other user even if the other user or users are logged in only under one or more guest accounts.

In step 208, each sharing user with a pre-existing personal account is correlated with any other users for whom the sharing user is a friend or buddy. The correlation may be performed at an instant messaging server.

In step 210, any other users for whom a sharing user with a pre-existing personal account is a friend or buddy is provided with a shared use indication that the sharing user is logged-in on a multi-user computer. The shared use indication notifies the other users that the sharing user is logged into a computer that lacks the privacy characteristic of conventional instant messaging. This allows the sender to choose appropriate language and information content for the instant message, thereby preventing instant messages from being sent to a sharing user with inappropriate confidential or sensitive information.

In step 212, an instant message is sent to one of the sharing users. For example, the message may be sent from a user for whom a sharing user with a pre-existing personal account is a friend or buddy.

In step 214, the instant message is rendered on the multi-user computer with as a minimally disruptive display to avoid disruption to the users' immersion in the media. In one implementation, the instant messages and friend presence indicators are slowly alpha-blended in over the running media (e.g., movie), slowly fading from clear to opaque, and then back to clear, all without a window bounding the messages. This contrasts with current messaging in which the message occludes the media and requires its own window. In one implementation, the messages are placed by default towards the edges and corners of the screen in which the media is playing, but users can optionally customize the positioning of their messages so that recipients can be quickly inferred from screen position.

In step 216, a reply instant message is sent from the multi-user computer. One implementation includes up to three reply message mechanisms for the multi-user computer 100. A first reply mechanism includes a number of pre-authored replies, which may be provided by the instant message system and modified by the user. An example of such a pre-authored message is "User1 and User2 are watching X with a guest, try later," in which User1, User2, and Guest are the names of users logged into the multi-user computer 100, X is the channel or program they are viewing, and these variables are completed automatically upon selection of the reply. A sharing user can generate such a pre-authored reply by activation of a remote control device of the type provided for a personal computer with media capabilities (e.g., video or audio), a video game console (e.g., not wireless), a cable television set-top box, etc.

When the pre-authored reply is received at a personal computer, a web-site for the channel can be viewed by the recipient of the reply. When the reply is received at another media-capable computer, the channel can be viewed by the one or more users at the computer. In the latter case, groups of friends can be gathered around common content on multiple multi-user computers.

As a second reply message mechanism, the incoming message may warrant a spontaneous reply in which case one or more users can share the multi-user computer keyboard (or other peripheral providing text input functionality) to type an instant message in the usual way.

As a third message reply mechanism, a participant may respond directly to the instant message on the participant's personal digital assistant (PDA) or cell phone. In this case the discussion is moved from the public screen of the multi-user computer to the private PDA or cell phone device.

FIG. 3 is an illustration of an instant messaging friend list graphical user interface 300 including a shared use indication 302 that a user friend is logged into a multi-user computer. Friends list user interface 300 would typically be rendered on a computer display of a user logged into an instant messaging system and includes a conventional logged-on indication 304 for each individual friend whose is logged into the system. A conventional unavailable indication 306 indicates each friend who is not available on the instant messaging system. Friends may be unavailable because they are not logged into the instant messaging system or because they are logged in but not receiving messages.

In accordance with the present invention, friends list user interface 300 includes shared use indication 302, which notifies the user viewing the user interface 300 that a friend 312 is logged-in on a multi-user computer with one or more other users. In the illustrated implementation, shared use indication 302 further includes indications of which users 314 and 316 are logged into the shared multi-user computer with the friend 312. For example, a sharing user 314 with a personal account is indicated by his or her personal account name, and a sharing user 316 without a personal account is indicated by the name "guest."

Shared use indication 302 resolves at the message-sending location privacy concerns about instant messaging with multiple users being located together. In this implementation, the multiple users who are located together, such as during a media session, are clearly as such by user interface 300. Even the presence of anonymous users or guests (i.e. participants who do not have instant messaging accounts or who have not logged on) is also indicated. This allows the sender to choose the language and information content of the instant message appropriately. In some implementations, the shared use indication might not specify the users with whom a selected user is sharing a multi-user computer.

Figure 4B:
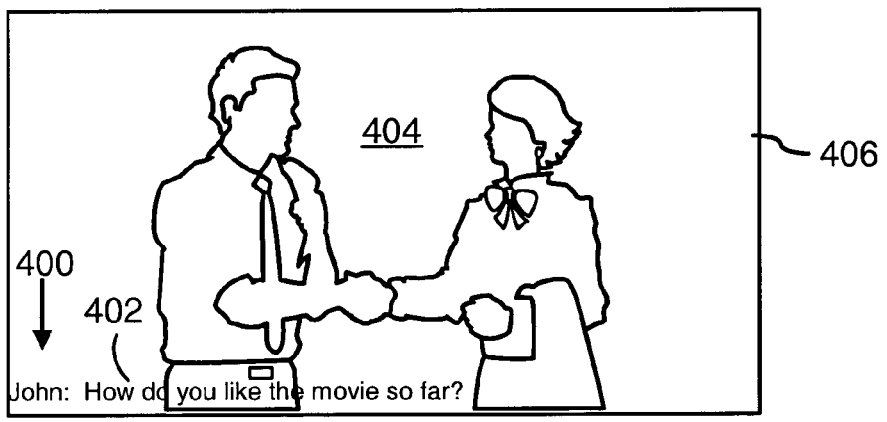
Figure 4C:
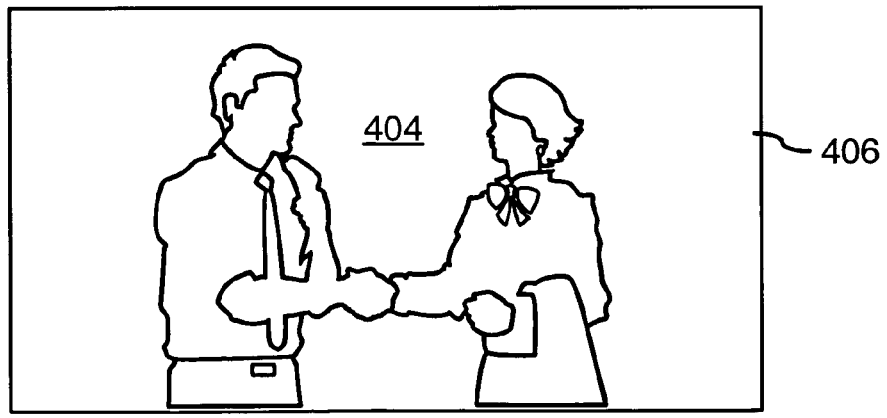

FIGS. 4A-4C are illustrations of a minimally disruptive instant message display 400 for rendering an instant message 402 on media 404 (e.g., a video or movie) being rendered on a display screen 406. FIGS. 4A-4C represent respective first, second, and third successive times during the display of instant message 402. Minimally disruptive display 400 minimizes disruption to the users' immersion in or concentration on the media 404 being played on display screen 400.

FIG. 4A illustrates an initial fade-in of message 402 over a portion of media 404 without a separate window bounding the message text. The fade-in of message 402 is indicated in FIG. 4A schematically by showing the text of message 402 in broken lines. The fade-in of message 402 is implemented as an alpha-blending of message 402 over the media 404 (e.g., movie), slowly fading from clear text toward opaque text. Message 402 may also be rendered over a background or with drop shadows to visually distinguish message 402 from media 404. In one implementation, the messages are placed by default towards the edges and corners of the screen 406 in which media 404 is playing, but users can optionally customize the positioning of their messages so that recipients can be quickly inferred from screen position.

FIG. 4B illustrates an opaque message 402 rendered over a portion of media 404 without a separate window bounding the message text. FIG. 4C illustrates a subsequent fade-out of message 402 from its opaque state in FIG. 4B to clear.

Figure 5:
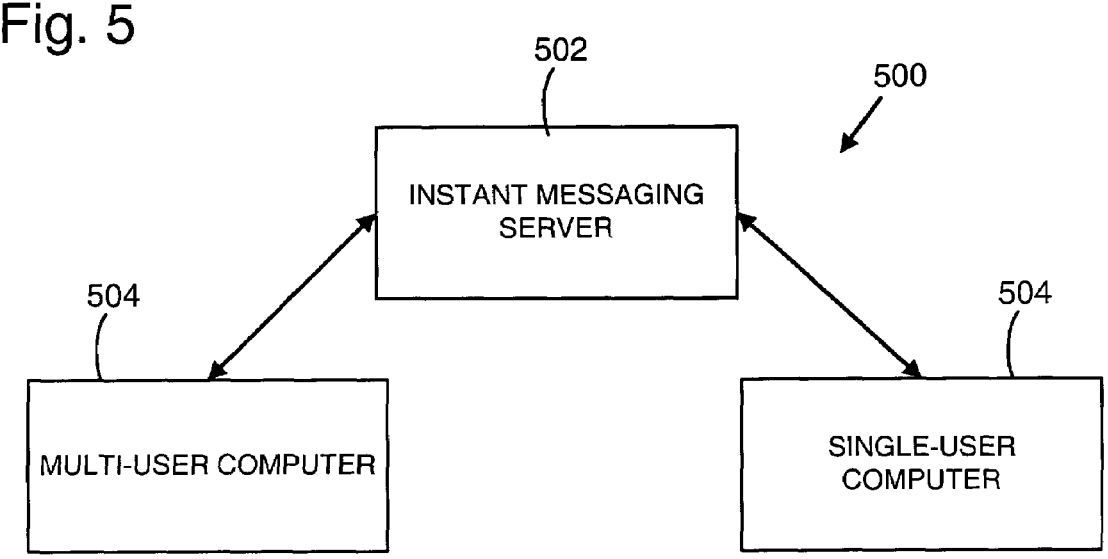
FIG. 5 is a block diagram of an instant message system with accommodation for multi-user computers.

FIG. 5 is a block diagram of an instant message system 500 with accommodation for multi-user computers. An instant messaging server 502 registers instant message users at one or more multi-user computers 504 (only one shown) and at one or more single-user computers 506 (only one shown) as the users log into system 500.

Instant messaging server 502 establishes instant message communication connections with computers 504 and 506 and provides to each of them a friend or buddy status indication. The friend or buddy indication provided to each computer 504 and 506 indicates the availability of the friends or buddies of the user or users logged into that computer.

With reference to FIG. 4, alpha-fading of messages 402 over video media 404, for example, is provided by rendering messages 402 with any of a variety of rendering tools applied to text messages generated according to a conventional instant message protocol. The rendering tools include Direct X, available from Microsoft Corporation, and Macromedia Flash MX available from Macromedia Corporation. It will be appreciated that other rendering tools could also be used, including Java.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A method for allowing instant messaging between a multi-user computer and an instant messaging device, comprising the steps of:
    receiving first login information from a first user of the multi-user computer by an instant messaging system;
    receiving second login information from a second user of the multi-user computer by the instant messaging system while the first user is logged in; and
    providing a shared use indication, wherein the shared use indication indicates a lack of privacy to the instant messaging device since the first user and the second user are concurrently logged into the instant message system together through the multi-user computer.

2. The method of claim 1 in which the second user is a guest and the second login information does not correspond to a specific instant messaging user.

3. The method of claim 1 further comprising the step of:
    providing a visual user interface to users of the multi-user computer concurrently with visual content from the multi-user computer.

4. The method of claim 3 further comprising the step of:
    rendering an instant message from the multi-user computer over a portion of a video display without a visible window surrounding the instant message.

5. The method of claim 4 in which the instant message is rendered with a user-discernible fade in and a user-discernible fade out.

6. The method of claim 4 in which the instant message is rendered over a marginal region of the video display.

7. The method of claim 4 in which the instant message is rendered over a user-selectable portion of the video display.

8. The method of claim 1, further comprising the step of:

providing a visual user interface to users of the multi-user computer concurrently with visual content from another source.

9. The method of claim 3 further comprising the step of transmitting one of plural predefined instant messages from the multi-user computer.

10. The method of claim 9 further comprising receiving from a wireless remote control device a user indication of the one of plural predefined instant messages transmitted from the multi-user computer.

11. A computer-readable medium having computer usable instructions stored thereon for execution by a processor to perform a method for allowing instant messaging between a multi-user computer and an instant messaging device, comprising the steps of:

receiving first login information form a first user of the multi-user computer by an instant messaging system;

receiving second login information from a second user of the multi-user computer by the instant messaging system while the first user is logged in; and providing a shared use indication, wherein the shared use indication indicates a lack of privacy to the instant messaging device that the first user and the second user are concurrently logged into the instant message system together through the multi-user computer.

12. The computer-readable medium of claim 11 further comprising the step of:

providing a visual user interface to users of the multi-user computer concurrently with visual content from the multi-user computer.

13. The computer-readable medium of claim 12 further comprising the step of rendering an instant message on a portion of a video display without a visible window surrounding the instant message.

14. The computer-readable medium of claim 13 in which the instant message is rendered with a user-discernible fade in and a user-discernible fade out.

15. The computer-readable medium of claim 13 in which the instant message is rendered over a marginal region of the video display.

16. The computer-readable medium of claim 13 in which the instant message is rendered over a user-selectable portion of the video display.

17. The computer-readable medium of claim 11 further comprising the step of:

providing a visual user interface to users of the multi-user computer concurrently with visual content from another source.

18. The computer-readable medium of claim 17 further comprising transmitting one of plural predefined instant messages.

19. The computer-readable medium of claim 18 in which the one of plural predefined instant messages transmitted from the multi-user computer is selected by a user with a wireless remote control device.

20. The computer-readable medium of claim 11 wherein the second user is a guest and the second login information does not correspond to a specific instant messaging user.

\* \* \* \* \*